United States Patent [19]

Ford et al.

[11] 4,456,412

[45] Jun. 26, 1984

[54] ATTACHMENT FOR A VERTICAL MILLING MACHINE

[75] Inventors: Ronald Ford; Vincent G. Ford; Martyn J. Ford, all of San Jose, Calif.

[73] Assignee: Varitork Research Mechanism, Inc., San Jose, Calif.

[21] Appl. No.: 345,804

[22] Filed: Feb. 4, 1982

[51] Int. Cl.³ .............................................. B23Q 3/12
[52] U.S. Cl. .................................... 409/233; 279/1 A; 279/1 TS; 408/140
[58] Field of Search ............... 409/231, 232, 233, 234; 279/1 A, 1 TS, 1 B; 408/140

[56] References Cited

U.S. PATENT DOCUMENTS

| | | | |
|---|---|---|---|
| 956,298 | 4/1910 | Cudahy | 408/140 |
| 2,244,143 | 6/1941 | Dowler | 408/140 |
| 2,523,584 | 9/1950 | Miller | 408/140 |
| 2,959,974 | 11/1960 | Emrick | 408/140 X |
| 3,350,731 | 11/1967 | Benjamin | 408/140 X |
| 3,625,530 | 12/1971 | Parsons | 409/233 |

FOREIGN PATENT DOCUMENTS

| | | | |
|---|---|---|---|
| 1627115 | 9/1970 | Fed. Rep. of Germany | 279/1 TS |
| 148936 | 6/1981 | German Democratic Rep. | 409/231 |
| 808552 | 2/1959 | United Kingdom | 279/1 B |
| 1583832 | 2/1981 | United Kingdom | 409/233 |
| 784994 | 12/1980 | U.S.S.R. | 409/233 |

*Primary Examiner*—William R. Briggs
*Attorney, Agent, or Firm*—Jack M. Wiseman; Francis W. Anderson

[57] ABSTRACT

An attachment for a vertical milling machine or the like provides a drive arrangement which provides for a selective high-torque drive connection, a low-torque yielding drive connection, or a complete disconnect.

8 Claims, 2 Drawing Figures 4,456,412

ATTACHMENT FOR A VERTICAL MILLING MACHINE

BACKGROUND OF THE INVENTION

Vertical milling machines are used extensively to perform a variety of machining operations, such as drilling, reaming and tapping, wherein a vertically oriented tool is removably secured in and projects downwardly from the lower end of a power driven spindle. When it is necessary to remove one tool and mount another tool in the spindle, the power must be turned off to stop the rotation of the tool. In a shop where several different machining operations are carried out on the same machine, the frequent shutting-down of the machine for tool changes is not only inconvenient, but also results in a considerable amount of lost time. It is therefore an object of the present invention to provide a drive mechanism wherein the driving connection between the tool carrier and the spindle can be interrupted so that tools can be changed while the spindle continues its rotation.

In some operations, such as drilling with a small-diameter drill bit, it is desirable to move the tool into engagement with the workpiece under controlled conditions of tool rotation in order to prevent tool breakage and the like, and it is an object of the present invention to provide a drive mechanism wherein simple hand pressure can slow down or stop the rotation of the tool when such controlled rotation is desired.

SUMMARY OF THE INVENTION

An attachment for a vertical milling machine includes a drive that has a clutch arrangement which permits the tool carrier to be driven under a condition of controlled low-torque mode, or to be completely stopped while the spindle continues to rotate.

DESCRIPTION OF A PREFERRED EMBODIMENT

Figure 1:
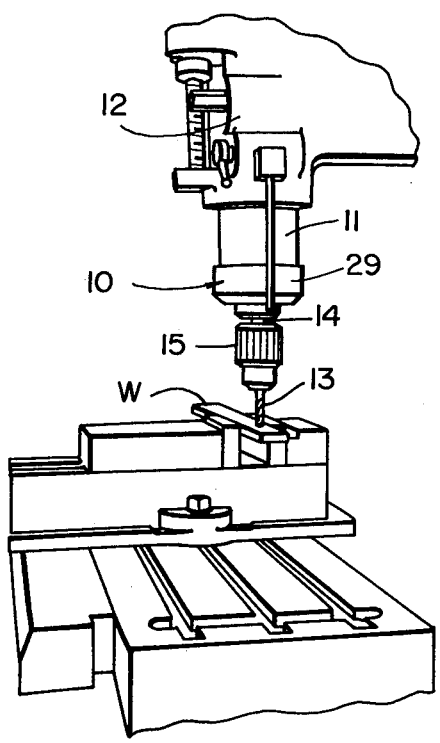
FIG. 1 is a fragmentary perspective of a portion of a vertical milling machine having the attachment of the present invention mounted thereon.

In FIG. 1 the reference numeral 10 indicates the milling machine attachment of the present invention connected to the quill 11 of a vertical milling machine 12 of Bridgeport type. A tool 13, which is secured to an arbor 14 of the attachment by a conventional chuck 15, such as a Jacobs chuck, projects downwardly toward a workpiece W on the bed of the machine.

Figure 2:
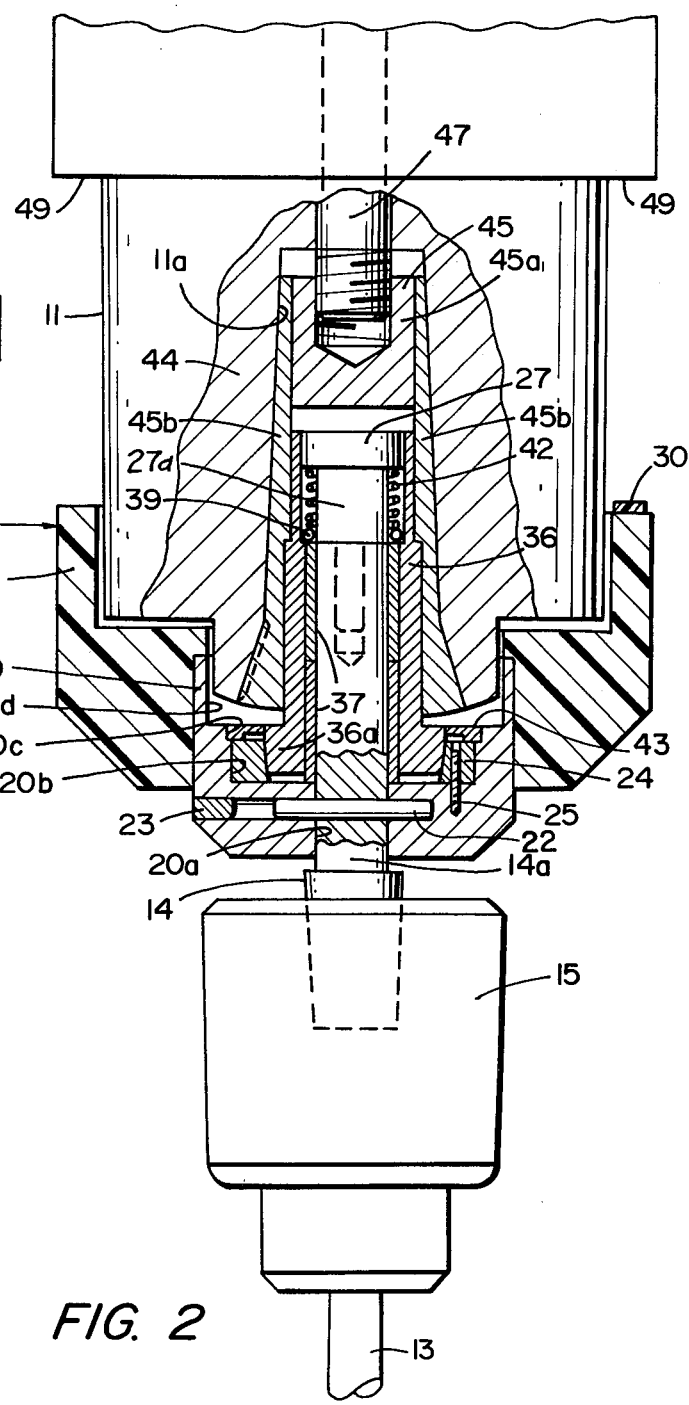
FIG. 2 is an enlarged diagrammatic side elevation, partly in section, of a portion of FIG. 1.

As seen in FIG. 2, the attachment 10 includes an inner aluminum housing 20 which has a central through bore 20a, and three blind bores 20b, 20c, and 20d of progressively increasing diameters respectively. The housing 20 has a generally cylindrical outer surface on which longitudinally-extending splines (not shown) are formed. A reduced diameter cylindrical section 14a of the arbor is secured by a shrink or press fit to the inner housing, and both members are then pinned together by a roll pin 22 to prevent vertical movement of the arbor when the drill chuck is fitted onto or removed from the tapered end of the arbor 11. A plug 23 closes the opening through which the roll pin 22 was driven. An annular bronze drive member 24 of the inner housing 20 is secured in the bore 20b by a light press fit and locked in place by a plurality of setscrews 25 spaced angularly around the axis of the drive member 24. The annular drive member 24 has a frusto-conical inner surface that tapers downwardly (FIG. 2) and inwardly. A shoulder screw 27 has a large diameter head, a reduced-diameter body 27a, and a lower end that is threaded into a tapered bore at the upper end of the upper cylindrical section 14a of the arbor 14.

An outer plastic housing 29 is disposed on the outer surface of the aluminum inner housing 20 in driven engagement with the longitudinal splines formed thereon. Three replaceable brake pads 30 (one only being shown) are positioned with a light press fit in upwardly-opening holes in the upper angular edge of the housing 29 in equi-angular spaced relation around the edge.

The drive assembly of the attachment 10 comprises a tubular drive shaft 36 made of carburized steel and having two bronze oilite bearing sleeves 37 pressed into its internal bore. The drive shaft 36 has an enlarged lower end 36a which has an outer frusto-conical surface 36b that tapers downwardly and inwardly to mate with the tapered inner surface of the drive member 24. It has been found that for carrying out drilling, reaming and tapping operations on a vertical milling machine, with the embodiment of the attachment 10 wherein the area of contact of the mating surface is about 0.75 sq. in., the taper on the mating surfaces is a 3° taper. With such a taper, the attachment 10 operates as a pressure sensitive unit with which drilling and reaming to ⅜″ diameter and tapping from 4–40 UNC to ⅜″ UNC can be performed.

To assemble the attachment 10 of the present invention, the inner housing 20, which will be referred to as the tool carrier along with the arbor 14 and the chuck 15, is connected to the drive shaft 36 by first removing the retaining screw 27 from the end of the arbor 14 to permit the upper portion 14a of the arbor 14 to be inserted into the sleeve bearings 37. It should be noted that the diameter of the upper section 14a of the arbor 14 is slightly smaller than the diameter of the bore of the bearings 37 so that there is a slight clearance between these members. A ring of ball bearings 39 is then positioned between the arbor 14 and the internal cylindrical surface of the tubular shaft 36 with the ring of ball bearings 39 resting on a surface provided by an end of one of the sleeve bearings 37 and by an annular shoulder provided on the inner surface of the tubular drive shaft 36. A coiled compression spring 42 is positioned around the arbor 14 in abutting relation with the ring of ball bearings 39. The assembly of the attachment 10 is then completed by threading the shoulder screw 27 onto the end of the arbor 14 to lock the spring 42 and the bearing unit 39 around the arbor 14. It is to be noted that the shoulder screw 27 is dimensioned so that when it is screwed down against the upper end of the arbor 14, a small downward preload pressure is placed on the drive shaft 36 through the spring 42. A grease seal 43 is fitted into the bore 20c of housing 20 so as to cover the drive member 24 but leave the bore of the member clear.

The attachment 10 is secured to a spindle 44 rotatably carried by the quill 11 of the milling machine by a collet 45 that has a hub 45a disposed centrally of a plurality of depending fingers 45b. The hub 45a is secured to the lower end of the draw bar 47 of the machine, and the collet fingers 45b have their outer surfaces in sliding engagement with the tapered internal wall 11a of the spindle 44. When the drive shaft 36 has been positioned in the collet 45, and the draw bar 47 is rotated by engaging it at its upper end (not shown), the collet 45 is drawn upwardly and the fingers 45b are forced inwardly to clamp the drive shaft 36 to the spindle 44.

A tool, such as a drill, tap or reamer, may then be connected to the arbor 14 by a chuck 15.

During assembly of the attachment 10, the retaining shoulder screw 27 is screwed down and locked on the upper end of the arbor 14. As mentioned above, the screw 27 is dimensioned so that, when it is locked down, a small downward preload pressure is put on the drive shaft 36 through the spring 42. The tapered surface of the drive section 36a is thus urged into contact with the inner tapered surface of the drive member 24 which carries the tool through the inner housing 20, the arbor 14 and the chuck 15. When the quill 11 is moved to its uppermost position after a machining operation, the brake pads 30 engage an overhanging ledge 49 of the machine housing to stop the rotation of the tool and cause the disengagement of the tapered driving surfaces of the drive shaft 36 and the drive member 24 of the housing 20, against the resistance of the preload pressure exerted by the spring 42. While the drive connection has been broken, the tool housing 20 can be rotated manually, the ball bearings 39 permitting rotation of the arbor relative to the drive shaft.

When a downward vertical movement is imparted to the quill 11 by actuation of the quill handle, the tapered drive surfaces are moved into engagement, and the brake pads 30 are moved away from the machine housing. In this condition, the small preload pressure exerted by spring 42 maintained a light contact of the tapered driving surfaces to cause rotation of the tool housing 20. If no point contact is made between the tool 13 and the workpiece W, the rotation of the tool 13 can be stopped by the application of hand pressure applied to the outer housing 29. It will be understood that, while the preload on the driving surface is relatively light, it is sufficient to enable the carrying-out of certain machining operations, such as reaming. It should also be noted that, due to the ability of the arbor 14 to shift slightly in the bearings 37, the tool 13 is in a "floating" condition which is desirable for certain reaming operations.

When a drilling operation is to be performed and the cutting tool 13 makes point contact with the workpiece W, the unit self-centers and the tapered drive surfaces become locked-in to transmit the torque required for the cutting operation. This locked-in condition of the tapered drive surfaces will remain until such time as the quill 11 is fully retracted.

The self-centering will take place regardless of the size of the cutting tool being used, however, the locking-in of the tapered drive surfaces is dependent upon the amount of torque required to rotate the cutting tool. Thus, when small cutting tools are being used, a small amount of torque is required and the tapered drive surfaces will not lock-in. As a result, the rotation of the tool can be stopped by the application of hand pressure to the outer housing 29. However, when large cutting tools are used, the torque requirements are high and the tapered surfaces lock-in. Thus, the amount of torque applied is infinitely variable, depending on the pressure applied at the quill handle.

From the foregoing description it will be apparent that the present invention provides an attachment for a vertical milling machine which includes a unique drive mechanism that permits tools to be changed without stopping the rotation of the spindle, and permits the operator to use the tool selectively in a high-torque or a low-torque machining operation.

I claim:

1. An attachment for a machine tool of the type that has a rotatable spindle carried in a vertically movable quill comprising a drive shaft adapted to be secured to the spindle, a tool carrier, means for supporting said tool carrier from said drive shaft including spring means for urging said carrier into driven engagement with said drive shaft, and a housing of enlarged cylindrical outer configuration secured to and surrounding said tool carrier and adapted to be manually gripped to resist rotation of said tool carrier while said tool carrier is in driven engagement with said drive shaft, said drive shaft and said tool carrier having frusto-conical surfaces arranged to be urged into mating contact by said spring means to establish the driving engagement, said drive shaft being a tubular member having a cylindrical bore with an annular shoulder at one end, said tool carrier having a cylindrical section extending through said bore with an enlarged cap on one end providing an annular shoulder in alignment with said annular shoulder on said drive shaft, said spring means being disposed around the cylindrical section of said tool carrier between said shoulders and being arranged to urge said shoulders away from each other.

2. The attachment of claim 1 wherein the frusto-conical surface on said drive shaft is an external surface and the frusto-conical surface on said tool carrier is an internal surface.

3. The attachment of claim 1 wherein the frusto-conical surface of said tool carrier is made of bronze material and the frusto-conical surface of said drive shaft is made of steel.

4. The attachment of claim 1 wherein the cylindrical bore of said drive shaft loosely receives the cylindrical section of said tool carrier to permit a sidewise self-adjusting movement of the tool carrier relative to the shaft.

5. The attachment of claim 3 wherein the taper on said mating frusto-conical surfaces is 3° relative to the axis about which said surfaces are generated.

6. The attachment of claim 1 wherein the mating frusto-conical surfaces are tapered 3 degrees relative to the axis about which the surfaces are generated.

7. An attachment for a machine tool of the type that has a rotatable spindle carried in a vertically movable quill comprising a drive shaft adapted to be secured to said spindle, a tool carrier, and means for supporting said tool carrier from said drive shaft including spring means for urging said tool carrier into driven engagement with said drive shaft, said drive shaft including a tubular member having a cylindrical bore with an upwardly-directed shoulder at one end and an exterior frusto-conical surface at the other end, said tool carrier comprising: an inner housing having a through bore and a blind bore concentric with said through bore, an annular bronze thrust member secured in said blind bore and having a frusto-conical inwardly facing surface, and a cylindrical arbor secured in said through bore and extending through the cylindrical bore of said tubular member with an enlarged diameter cap providing an annular shoulder opposite the annular shoulder on said drive shaft, said spring means comprising a coiled compression spring disposed around the cylindrical arbor between the shoulder on said cap and the shoulder on said drive shaft.

8. An attachment for a machine tool of the type that has a rotatable spindle carried in a vertically movable quill comprising a drive shaft adapted to be secured to the spindle, a tool carrier, means for supporting said tool carrier from said drive shaft including spring means for urging said carrier into driven engagement with said drive shaft, said drive shaft including a tubular member having a cylindrical bore wih an upwardly directed shoulder at one end and a frusto-conical surface at the other end, said tool carrier including an inner housing having a through bore and a blind bore concentric with said through bore, an annular thrust member secured in said blind bore and having a frusto-conical surface, and a cylindrical arbor secured in said through bore and extending through the cylindrical bore of said tubular member with an enlarged diameter cap providing an annular shoulder opposite the annular shoulder on said drive shaft, said spring means comprising a coiled compression spring disposed around the cylindrical arbor between the shoulder on said cap and the shoulder on said drive shaft.

* * * * *